United States Patent
Bikumala et al.

(10) Patent No.: US 11,562,121 B2
(45) Date of Patent: Jan. 24, 2023

(54) AI DRIVEN CONTENT CORRECTION BUILT ON PERSONAS

(71) Applicant: Dell Products L. P., Round Rock, TX (US)

(72) Inventors: Sathish Kumar Bikumala, Round Rock, TX (US); Karthik Ranganathan, Round Rock, TX (US); Tejas Naren Tennur Narayanan, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 357 days.

(21) Appl. No.: 16/941,651

(22) Filed: Jul. 29, 2020

(65) Prior Publication Data

US 2022/0035992 A1 Feb. 3, 2022

(51) Int. Cl.
*G06F 40/166* (2020.01)
*G06N 20/00* (2019.01)
*G06N 5/04* (2006.01)
*G06Q 10/10* (2012.01)
*G06F 40/30* (2020.01)
*G06Q 30/00* (2012.01)
*G06Q 30/02* (2012.01)
*G06F 16/9536* (2019.01)
*G06F 16/9535* (2019.01)
*G06Q 50/00* (2012.01)

(52) U.S. Cl.
CPC ........ *G06F 40/166* (2020.01); *G06F 16/9535* (2019.01); *G06F 16/9536* (2019.01); *G06F 40/30* (2020.01); *G06N 5/04* (2013.01); *G06N 20/00* (2019.01); *G06Q 10/105* (2013.01); *G06Q 30/016* (2013.01); *G06Q 30/0201* (2013.01); *G06Q 50/01* (2013.01)

(58) Field of Classification Search
None
See application file for complete search history.

(56) References Cited

U.S. PATENT DOCUMENTS

| | | | | |
|---|---|---|---|---|
| 9,218,333 | B2* | 12/2015 | Liensberger | G06F 40/166 |
| 10,133,589 | B2* | 11/2018 | Voronkov | G06F 3/0481 |
| 2015/0350144 | A1* | 12/2015 | Zeng | H04L 51/23 |
| | | | | 709/206 |

(Continued)

*Primary Examiner* — Nafiz E Hoque
(74) *Attorney, Agent, or Firm* — Krishnendu Gupta; Deepika Bhayana; Derek Lam

(57) ABSTRACT

A machine learning (ML) module that analyzes multiple language-influencing factors to correct textual content in a more meaningful and efficient manner. In the context of product support, the ML module considers the factors such as a customer's persona that shapes the words a customer chooses while speaking/writing to a customer support agent, current social trends that create new words in the social media/social platforms related to the customer's support issue, and the device used by the customer to input the textual content because different words may be input by the customer when using a smart phone versus a desktop/laptop personal computer with a traditional keyboard. The ML module also may analyze the agent's persona to modify agent's response to the customer because the agent's persona can influence the content of the agent's text. The ML module automatically corrects textual content in real-time before it is sent to the relevant recipient.

20 Claims, 5 Drawing Sheets

(56) References Cited

U.S. PATENT DOCUMENTS

2018/0293483 A1* 10/2018 Abramson .............. H04L 51/02
2018/0367480 A1* 12/2018 Housman .............. G06F 40/247
2019/0205372 A1* 7/2019 Li .......................... G06N 20/00
2022/0012296 A1* 1/2022 Marey ................ G06F 16/9538

* cited by examiner

AI DRIVEN CONTENT CORRECTION BUILT ON PERSONAS

TECHNICAL FIELD

This disclosure relates generally to automatic processing of textual content and, more particularly, to an Artificial Intelligence (AI) based correction of textual content using insights derived from an analysis of multiple factors influencing the language of the textual content.

BACKGROUND

As the value and use of information continues to increase, individuals and businesses seek additional ways to process and store information. One option available to users is information handling systems (IHS). An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Modern information handling systems include many different types of consumer and commercial electronic devices such as, for example, personal computers (e.g., desktops or laptops), tablet computers, mobile devices (e.g., personal digital assistants (PDAs) or smart phones), corporate (or small business) server and data processing systems, and the like. These devices may vary in size, shape, performance, functionality, and price. In any event, almost all of these modern devices are equipped with relevant hardware and software to allow their users to access the Internet to perform various online activities such as, for example, browsing different websites, carrying out online business transactions, playing online games, participating in online meetings or chat sessions, and so on.

In today's increasingly virtual world, when a customer support issue arises for an information handling system, the user of the system almost invariably turns to online resources—such as, for example, online discussion forums, the device manufacturer's support website, or a chat session with a customer service agent—to find a solution to the problem afflicting the user's system. Such online support mechanism primarily involves textual inputs/queries from the user in a specific language to search for available solutions online or a textual communication with a customer service agent in the form of back-and-forth exchange of chat messages.

SUMMARY

This Summary provides a simplified form of concepts that are further described below in the Detailed Description. This Summary is not intended to identify key or essential features and should therefore not be used for determining or limiting the scope of the claimed subject matter.

In the context of textual communication related to online customer support, the present disclosure relates to using an AI-based machine learning (ML) module to analyze a number of language-influencing factors to correct the customer's textual queries or chat messages to enable the customer to receive more meaningful product support in an efficient manner. Three primary language-influencing factors are: (i) the customer's persona (like cultural background, ethnicity, education level, state of mind, browsing pattern, prior service history, and so on) that shapes the words a customer chooses while speaking/writing to a customer support agent, (ii) current social trends that create new words in the social media/social platforms related to the customer's support issue, and (iii) the device (or information handling system) being used by the customer to input the textual content because, for example, different words may be input by the customer when using a smart phone versus a desktop/laptop personal computer (PC) with a traditional keyboard. When a customer service agent logs his/her observations into the system or sends a textual response to the customer, the agent's persona (like the level of subject matter expertise, typing speed, prior knowledge of the issue, prior performance history, and so on) also influences the content of the agent's text. The ML module analyzes such language-influencing factors to derive insights to correct the textual content input by the sender—whether the customer or the agent—before it is sent to the relevant recipient. In that regard, the ML module goes beyond mere translation of a text (such as, for example, a dictionary-based spelling correction or translation of a word/phrase); it intelligently corrects (or modifies) the original text to more accurately reflect the context and nature of communication to thereby facilitate an easy comprehension and a more meaningful resolution of the issue on hand. The ML module also may provide an automated process of real-time correction of textual content from the customer as well as the customer service agent based on the analysis of relevant language-influencing factors.

In one embodiment, the present disclosure is directed to a method, which comprises: (i) receiving, by a computing system, a textual content sent by a first communicator for delivery to a second communicator; (ii) determining, by the computing system using a machine learning (ML) module, a set of language-influencing factors affecting the textual content sent by the first communicator, wherein the set of language-influencing factors comprises: (a) a persona that reflects first communicator-specific individual characteristics shaping the textual content generated by the first communicator, (b) information available in social media related to the textual content, and (c) a set of device properties specific to a device being used by the first communicator for sending the textual content; (iii) modifying, by the computing system using the ML module, the textual content based on the set of language-influencing factors to generate a modified textual content; and (iv) sending, by the computing system, the modified textual content to the second communicator instead of the (original) textual content. The ML module may be AI-based. In particular embodiments, the method further comprises modifying the textual content based on not only the set of language-influencing factors, but also on the second communicator's persona. Furthermore, in some embodiments, a response from the second communicator (for example, a customer service agent) may be modified based on the first communicator's persona and the properties of the first communicator's device, and the modified response may be sent to the first communicator.

In another embodiment, the present disclosure is directed to a computing system, which comprises: a memory storing program instructions; and a processing unit coupled to the memory and operable to execute the program instructions. In the computing system, the program instructions, when executed by the processing unit, cause the computing system to: (i) receive a textual content sent by a first communicator for delivery to a second communicator; (ii) determine, using an ML module, a set of language-influencing factors affecting the textual content sent by the first communicator, wherein the set of language-influencing factors comprises: (a) a persona that reflects first communicator-specific individual characteristics shaping the textual content generated by the first communicator, (b) information available in social media related to the textual content, and (c) a set of device properties specific to a device being used by the first communicator for sending the textual content; (iii) modify, using the ML module, the textual content based on the set of language-influencing factors to generate a modified textual content; and (iv) send the modified textual content to the second communicator instead of the (original) textual content.

In a further embodiment, the present disclosure is directed to a computer program product comprising a non-transitory computer-usable medium having computer-readable program code embodied therein, wherein the computer-readable program code is adapted to be executed by a computing system to implement a method. The method comprises: (i) receiving a textual content sent by a first communicator for delivery to a second communicator; (ii) determining, using an ML module, a set of language-influencing factors affecting the textual content sent by the first communicator, wherein the set of language-influencing factors comprises: (a) a persona that reflects first communicator-specific individual characteristics shaping the textual content generated by the first communicator, (b) information available in social media related to the textual content, and (c) a set of device properties specific to a device being used by the first communicator for sending the textual content; (iii) modifying, using the ML module, the textual content based on the set of language-influencing factors to generate a modified textual content; and (iv) sending the modified textual content to the second communicator instead of the (original) textual content.

The ML module as per teachings of the present disclosure is an AI-based analytical tool that is not a translator, but a corrector of text that intelligently modifies online textual content based on an analysis of a number of language-influencing factors to make the text more meaningful to the reader or recipient of the text. The ML module may operate as a sender-specific text corrector that modifies the sender's text based on a number of factors before presenting the text to the reader (such as, for example, a customer service agent) or another recipient (such as, for example, an online search engine). Such modification not only provides clarity and context to the original text, but also takes into account linguistic nuances and evolution of language (such as, for example, new words created in the social media) that typically remain unrecognized by a machine-based translator, grammar-checker, thesaurus, or spell-checker. Furthermore, the text correction by the ML module also takes into account the device being used by the sender of the text to apply the necessary correction to the text generated by the device or received at the device. Such intelligent, pro-active, and real-time correction of textual content in an online communication significantly enhances the readability, accuracy, and, in certain cases, automated processing of the text. In a product support scenario, this results in an efficient and timely resolution of a customer's issue/complaint without frustrating the customer, thereby increasing customer satisfaction and improving corporate product support efforts.

BRIEF DESCRIPTION OF THE DRAWINGS

A more complete understanding of the present disclosure may be obtained by reference to the following Detailed Description when taken in conjunction with the accompanying Drawings. For ease of discussion, the same reference numbers in different figures indicate similar or identical items.

DETAILED DESCRIPTION

Figure 1:
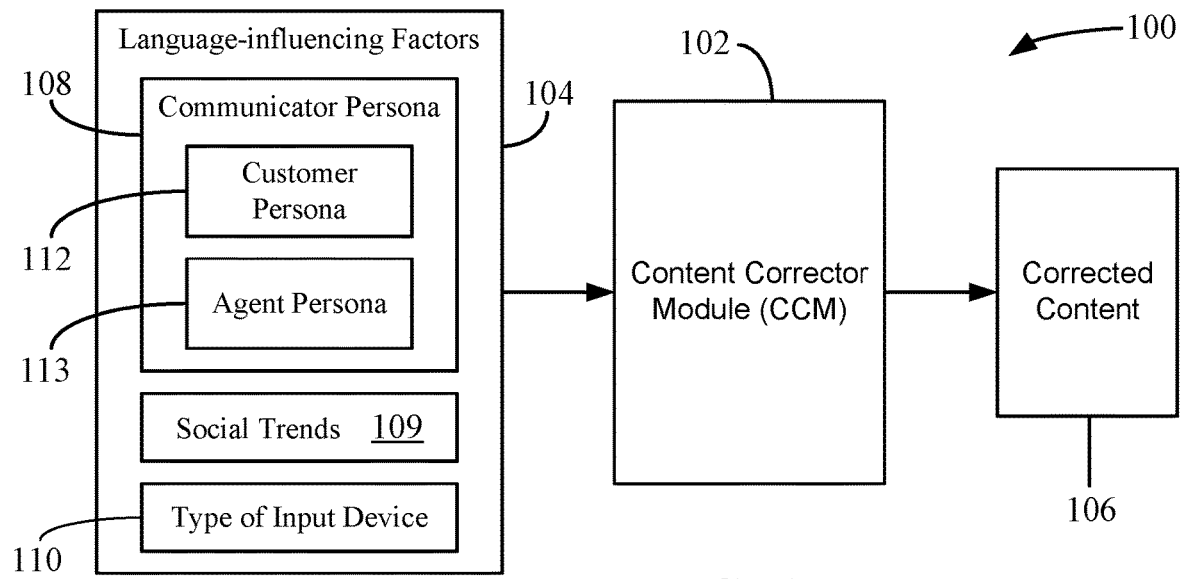
FIG. 1 shows an exemplary block diagram showing how a content corrector module as per particular embodiments of the present disclosure may be implemented.

For purpose of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, a network controller, or any other suitable device, and may vary in size, shape, performance, functionality, and price. The information handling system may include random access memory (RAM), one or more processing resources such as a central processing unit (CPU) or hardware or software control logic, read-only memory (ROM), and/or other types of nonvolatile memory. Additional components of the information handling system may include one or more disk drives, one or more network ports for communicating with external devices as well as various input and output (I/O) devices, such as a keyboard, a mouse, touch-screen and/or video display. The information handling system may also include one or more buses operable to transmit communications between the various hardware components.

It is noted here that, for ease of discussion, a computer software, program code or module may be referred to as "performing," "accomplishing," or "carrying out" a function or process. However, it is evident to one skilled in the art that such performance may be technically accomplished by a processor when the software or program code is executed by the processor. The program execution would cause the processor to perform the tasks or steps instructed by the software to accomplish the desired functionality or result. However, for the sake of convenience, in the discussion below, a processor or software component may be referred to interchangeably as an "actor" performing the task or action described, without technically dissecting the underlying software execution mechanism. Furthermore, a hyphenated term (e.g., "language-influencing", "computer-readable", "AI-based", etc.) may be occasionally interchangeably used with its non-hyphenated version (e.g., "language influencing," "computer readable", "AI based", etc.), and a capitalized entry (e.g., "Content Corrector Module", "Machine Learning," "Customer Persona", etc.) may be interchangeably used with its non-capitalized version (e.g., "content corrector module," "machine learning," "customer persona", etc.). Such occasional interchangeable uses shall not be considered inconsistent with each other.

As mentioned before, when a customer support issue arises for an information handling system, the user of the system almost invariably turns to online resources—such as, for example, online discussion forums, the device manufacturer's support website, or a chat session with a customer service agent—to find a solution to the problem. Such online support mechanism primarily involves textual inputs/queries from the user in a specific language (for example, English) to search for available solutions online or a textual communication with a customer service agent in the form of back-and-forth exchange of chat messages. However, the user may not be technically savvy or may not write technically-relevant terms to clearly convey the issue to the relevant recipient (for example, a search engine or a human agent). If the service agent or the support website misinterprets the user's query or misunderstands user's problem due to not-so-clear query from the user, the solution-finding may become a frustrating exercise for the user as well as the support agent. Mere verbatim translation or automatic spelling/grammar correction (for example, using a machine-based dictionary, thesaurus, or a spell-checker/grammar-correction program) of the user's text may not be enough, especially when the automated system fails to take into account linguistic nuances and user-specific language-influencing factors affecting the user's choice of words. As a result, any attempt to automate product support or increase the effectiveness of online textual communication between two parties remains stymied.

Textual correction can be an easy task if the person preparing the text has mastered the relevant language to a level he/she can input into a computing machine. However, as noted before, in a technical support scenario, the user/customer may not be technically savvy enough to input the correct terms in his/her support query/message. Furthermore, word correction by a computing device currently involves matching a word against a dictionary of known strings; any input string not found in the dictionary is deemed as a misspelling, and the dictionary itself may be incomplete or limited in its scope (for example, may not contain all modern technical jargon or usages). Additionally, in case of English as an example, there are multiple language nuances (for example, geographical, cultural, gender-based, race-based, ethnicity-based, and so on) that are not recognized or yet to be recognized by a computing device. Still further, the language itself is continually evolving, especially in view of the explosion of social media platforms. For example, new words in English are being created overnight in the social media in terms of hashtags and conjoining words. Another aspect to consider is that the word selection by a user may depend on the input device being used to input the text. For example, the user may often choose short words, acronyms, or user's own short forms for certain words when writing the text using a smart phone because of screen limitations and how the user holds the phone while typing. Such may not be the case if the user is inputting text using a desktop or laptop PC with a traditional keyboard.

It is therefore desirable to devise an automated tool that can go beyond simple translation or grammar-checking of a textual content. The need for such a tool is more pronounced in many applications such as, for example, the earlier-mentioned task of online product support where clarity in communication provides an expeditious and fruitful resolution of a customer's problem, resulting in a satisfied customer base and increased goodwill for the corporate entity providing such support. It is further desirable that, to provide a meaningful textual correction, the tool can address many different factors that influence a user's language and the textual expression in that language.

The present disclosure relates to using an AI-based machine learning (ML) module to analyze a number of language-influencing factors to correct textual content in a more meaningful and efficient manner. In the context of a product support environment, the ML module may take into account such language-influencing factors as: (i) a customer's persona (like cultural background, ethnicity, education level, state of mind, browsing pattern, prior service history, and so on) that shapes the words a customer chooses while speaking/writing to a customer support agent, (ii) current social trends that create new words in the social media/social platforms related to the customer's support issue, and (iii) the device (or information handling system) being used by the customer to input the textual content because, for example, different words may be input by the customer when using a smart phone versus a desktop/laptop personal computer (PC) with a traditional keyboard. When a customer service agent logs his/her observations into the system or sends a textual response to the customer, the ML module also may analyze the agent's persona (like the level of subject matter expertise, typing speed, prior knowledge of the issue, prior performance history, and so on) because the agent's persona influences the content of the agent's text. Based on an analysis of multiple language-influencing factors, the ML module may derive insights to more meaningfully correct the textual content input by the sender—whether the customer or the agent—before it is sent to the relevant recipient. In one embodiment, the textual correction may be automatic and in real-time. In a product support scenario, this results in an efficient and timely resolution of a customer's issue/complaint without frustrating the customer.

It is noted at the outset that although the discussion below is provided primarily in the context of a product support application, the ML-based textual correction approach discussed herein remains applicable in other areas as well (such as, for example, an airline customer support portal, a product recommendation or guide site, an online marketplace or retailer site, and the like). However, for the sake of brevity and ease of discussion, textual correction in the context of all such other applications is not addressed. Furthermore, an information-handling system and its components (hardware and software) are treated as "products" in the discussion below. However, in other embodiments, the "product" may be any technical or non-technical item or software.

It is also noted here that the terms "corporate entity," "company," or other terms of similar import may be used interchangeably herein to refer to a business entity or commercial enterprise that provides services of product support agents and/or a product support website to its customers. Similarly, the terms "product support agent," "agent," "customer service agent," or other terms of similar import may be used interchangeably as well. For the present disclosure, it is not relevant whether the product support agents are directly employed by the company or a third party service provider. Additionally, the terms "client" or "customer" may be used interchangeably herein to refer to a person having a business relationship with the corporate entity such as, for example, through an earlier purchase of a product sold by the corporate entity. To facilitate ease of discussion, in certain instances, the term "user" may refer to either the agent or the customer, as may be evident from the context of discussion.

It is further noted here that, merely for ease of discussion, the term "online" may not always appear along with the terms "textual content," "chat message," "search query," and the like. However, it is understood that, despite such absence of mention, the discussion herein primarily applies to correction of textual content appearing in online communication (for example, over the Internet). In certain embodiments, as mentioned later, correction of text of audio transcripts also may be performed using the teachings of the present disclosure.

FIG. 1 shows an exemplary block diagram 100 showing how a content corrector module (CCM) 102 as per particular embodiments of the present disclosure may be implemented. The CCM or CC module 102 also may be referred to herein as the "ML module." In particular embodiments, the CCM 102 may be an AI-based software application comprising program code, which, upon execution by a processor in an information handling system (such as the processor 802 in the computer system in FIG. 8), may cause the information handling system to perform various operational tasks discussed below with reference to FIGS. 2-7. The information handling system may be owned or operated by a corporate entity to provide enhanced customer support, and may deploy the CC module 102 for automated correction of product support related textual content for a meaningful product support. In some embodiments, the CCM 102 may function as a stand-alone software application or part of another software application (such as, for example, a data analytics software or a text processing application) that is configured to interact with the user's (customer's or agent's) web browser or other similar software. Thus, the CC module 102 may run on an information handling system that is different from the system through which the user's (customer's or agent's) web browser is connected to the Internet and communicating textual content. In other embodiments, the CC module 102 may be integrated with the user's web browser as an add-on component that automatically corrects the user's text before it is sent by the browser. The operational details of the CC module 102 are given below with reference to FIGS. 2-7.

More generally, the CC module 102 may process multiple language-influencing factors 104 to determine the correction(s) to be applied to a communicator's textual content, and, may subsequently generate a corrected version of the original textual content—as indicated at block 106—after applying the necessary correction(s). In the context of the product support scenario being discussed here, some exemplary language-influencing factors include: (i) the persona of a communicator of the textual content, as noted at block 108; (ii) social trends (or other information available on various online social media platforms) relevant to the textual content or support issue, as noted at block 109; and (iii) the type of the input device and device properties of the information handling system (or other communication device) being used by the communicator (customer or agent) for sending the textual content, as noted at block 110. As shown in FIG. 1, the communicator persona 108 may include the customer persona (block 112) or the agent persona (block 113) depending on who is the originator of the textual content to be analyzed by the CCM 102. Some examples of these language-influencing factors 104 are already mentioned earlier. Additional details of these language-influencing factors is provided later with reference to discussion of FIGS. 3 and 4.

As an example, if a customer sends a chat message to an agent with the textual content "my machine is not working," the CCM 102 may first analyze this original text based on the customer persona 112, social trends 109, and device properties 110 of the customer's input device to identify the context of the customer's message (here, the product support issue) and what the customer means by the term "machine." Based on its analysis of the relevant, customer-specific language-influencing factors, the CC module 102 may determine that the customer's device is a laptop computer of XYZ brand. As a result, the CC module 102 may modify the original text to generate the corrected content 106, which, in this case, may read "XYZ laptop is not working." This corrected text may be then sent to the service agent to enable the agent to provide a more accurate and meaningful product support to the client/customer. In certain embodiments, if the CCM 102 detects that the client is a non-technical person or someone with limited technical skills, the agent's response may be similarly modified to present it in a language that is easily understood by the client. For example, if the agent writes "Your GUI needs to be updated," the CCM 102 may modify it to read "Your web browser needs to be updated" when presented to the non-savvy customer. Additional such examples are discussed later with reference to FIGS. 5-6.

In particular embodiments, the CC module 102 may use machine learning techniques to identify and analyze relevant language-influencing factors (at block 104) to determine the textual correction or modification to be applied to the text received from a communicator. In addition to a customer and an agent being the "communicators," in some embodiments, a product support website or database hosting technical support articles or discussion may be treated as a "communicator" by the CC module 120 as discussed later with reference to FIGS. 5 and 7. In one embodiment, the ML-based CC module 102 may be trained using historical texts of customer-agent interactions (for example, chat transcripts of prior service requests) or customer search queries (for example, to a technical support website or search platform), along with information available in the social media related to the company's line of business, product offerings, and product reviews. Additional training material may include background information about customers of the company such as, for example, details of the product orders placed in the past by a specific client; and the customer profile of a client with information about race, gender, ethnicity, education level, employment status, and so on. Furthermore, technical and physical details (for example, outside dimensions, installed operating systems) of the company's products may be useful in training the CC module 102, for example, to identify patterns of text the clients may prefer to use when inputting text using a specific device (for example, a smart phone versus a desktop PC, or speaking over a microphone to input text). In general, the data schema of various language-influencing factors shown in FIG. 3 may be used as a guide to select similar data for training the CCM 102. In particular embodiments, the training of the CC module 102 may be an on-going event in the sense that the module 102 may be continually trained based on the results of its performances at run-time.

The training of various ML-based classifiers and analytical tools in the CC module 102 may generate a trained version of the CC module 102. In particular embodiments, the trained version of the CC module 102 may be deployed to receive the textual content from a communicator, determine the relevant language-influencing factors that may be considered for the received textual content, and modify the textual content in view of the relevant language-influencing factors to generate the corrected content (at block 106 in FIG. 1) as briefly discussed earlier and as also discussed in more detail later. However, for ease of discussion, the qualifier "trained" may be omitted when providing details of correction of textual content by the CC module 102 as per teachings of the present disclosure. In other words, the reference numeral "102" also may refer to the trained version of the CC module as per teachings of the present disclosure, as may be evident from the context of discussion.

Figure 2:
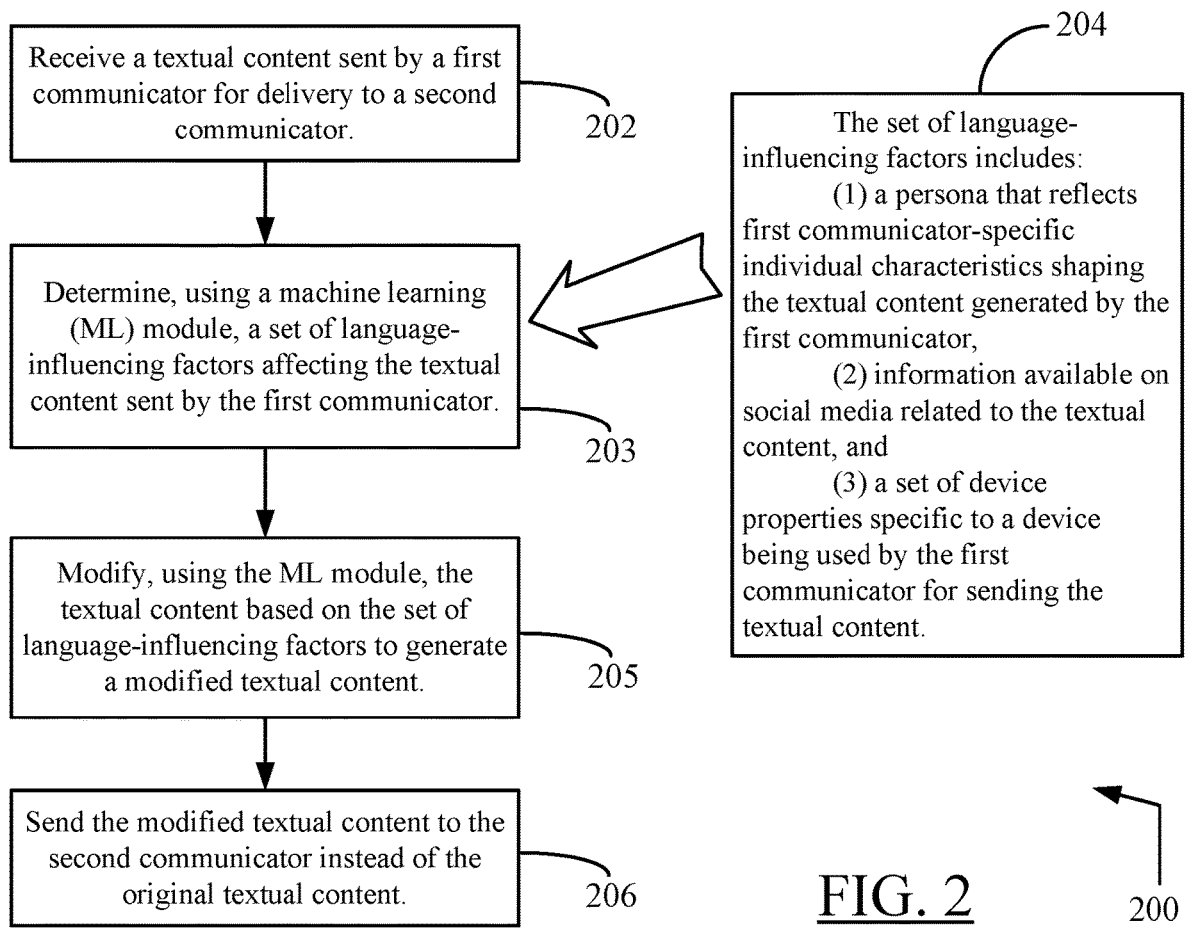
FIG. 2 is an exemplary flowchart depicting various steps that may be performed by a computing system as per particular embodiments of the present disclosure to carry out correction of textual content using the CCM of FIG. 1.

FIG. 2 is an exemplary flowchart 200 depicting various steps that may be performed by a computing system as per particular embodiments of the present disclosure to carry out correction of textual content using the CCM 102 of FIG. 1. In one embodiment, the computing system may be the system shown in FIG. 8 and discussed later below. More generally, the computing system performing the steps shown in FIG. 2 may include in hardware and/or software the functionality of the CC module 102. In one embodiment, the program code for the CC module 102 (and other relevant program code such as the program code for an operating system managing the execution of the module 102) may be executed by a processor (such as the processor 802 in FIG. 8) in the computing system, and, upon execution of the program code, the computing system may be operative to perform the tasks illustrated in FIG. 2.

In the flowchart 200, each block represents one or more tasks that can be implemented in hardware, software, or a combination thereof. In the context of software, the blocks represent computer-executable instructions that, when executed by one or more processors, cause the processors to perform the recited tasks. Generally, computer-executable instructions include routines, programs, objects, modules, components, data structures, and the like that perform particular functions or implement particular abstract data types. The order in which the blocks are described is not intended to be construed as a limitation, and any number of the described tasks can be combined in any order and/or in parallel to implement the process shown in the flowchart 200. For discussion purpose, the process in the flowchart 200 is described with reference to FIG. 1 as discussed above and other relevant figures to be discussed later, although other models, frameworks, systems and environments may be used to implement this process.

Figures 4, 5:
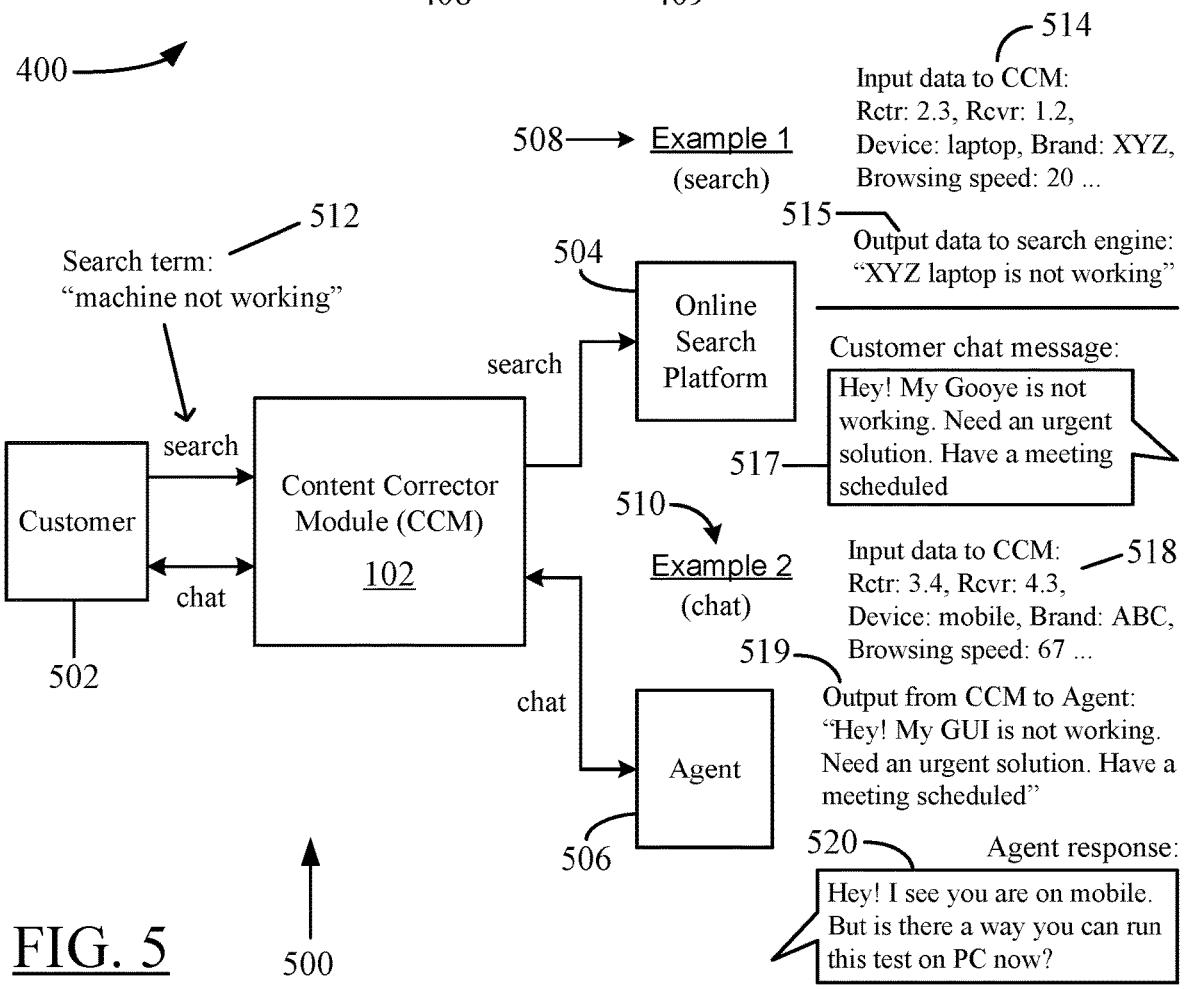
FIG. 4 shows an exemplary set of data fields associated with the data schema illustrated in FIG. 3.
FIG. 5 is an exemplary block diagram providing an overview of two different types of content correction by the CCM of FIG. 1 as per certain embodiments of the present disclosure.
Figure 6:
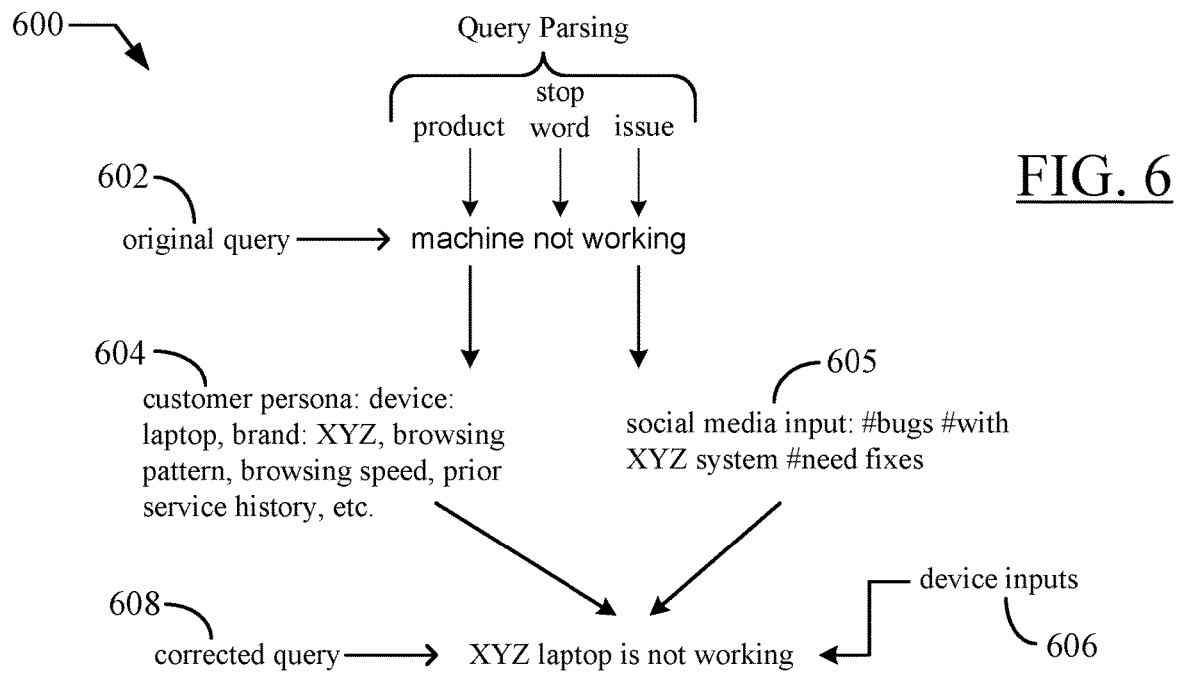
FIG. 6 is an exemplary illustration of how the contents of a textual search query may be corrected by the CCM of FIG. 1 as per particular embodiments of the present disclosure.

Initially, the computing system (for example, the computer system 800 in FIG. 8) may receive a textual content sent by a first communicator (for example, a customer) for delivery to a second communicator (for example, an agent or a search engine), as noted at block 202. In one embodiment, the first communicator may be a human user requesting user-specific information from a corporate entity and the second communicator may be a human operator associated with the corporate entity to provide customer support or an online search facility deployed by the corporate entity to provide product support. In another embodiment, the first communicator may be the human operator and the second communicator may be the human user. In the context of a product support environment, the computing system may be affiliated with a corporate entity providing or offering product support to its customers. The product support network may be configured such that back-and-forth exchanges of textual content would initially go through the computing system to allow it to apply necessary textual corrections as per teachings of the present disclosure before sending the content to its intended recipient. In particular embodiments, the computing system may host the company's support website where a customer can search for articles or discussion to find a solution to his/her problem, or initiate an online chat session with a customer service agent to explore the option of live product support. In some embodiments, the content received at block 202 may be stored in a memory (such as the memory 804) of the computing system. Some examples of such textual content are shown in FIGS. 5 and 6.

As noted at block 203, the computing system may determine—using an ML module such as the CC module 102—a set of language-influencing factors affecting the textual content sent by the first communicator. As mentioned before, these factors influence a user's choice of words in a sentence or the construction of the sentence. In some embodiments, the language-influencing factors may be communicator-specific. For example, as noted at block 204, the set of language-influencing factors may include: (i) a persona that reflects first communicator-specific individual characteristics shaping the textual content generated by the first communicator, (ii) the information available in social media related to the textual content, and (iii) a set of device properties specific to the device being used by the first communicator for sending the textual content. An exemplary set of language-influencing factors are discussed below with reference to FIG. 3. Thereafter, as noted at block 205, the computing system may modify—also using the ML module 102—the textual content (received at block 202) based on the set of language-influencing factors to generate a modified textual content. Such textual correction is illustrated through some examples in FIGS. 5-6 (discussed later). The computing system may then send the modified textual content (generated at block 205) to the second communicator instead of the original textual content (received at block 202), as noted at block 206.

In this manner, the computing system may perform an automated correction of textual content to enable the recipient of the text to comprehend the text in an effective manner and to facilitate a meaningful resolution of a customer's support issue, while significantly mitigating the risks associated with a manual translation of the text or second-guessing of the sender's intent. Regardless of the nature or complexity of a customer's problem, it is important to point out that the automated textual correction afforded by the CC module 102 not only saves countless manual hours that would have been expended by customers and service agents alike in comprehending incorrect or incomplete customer queries and resolving customer complaints, but it also streamlines the product support process based on automatic and consistent textual correction specifically tailored to the recipient of the text. The textual modification performed by the CCM 102 not only provides clarity and context to the original text, but also takes into account linguistic nuances and evolution of the language to offer an intelligent, pro-active, and real-time correction of textual content in an online communication. This significantly enhances the readability and accuracy of the text, which, in a product support scenario, results in an efficient and timely resolution of a customer's issue/complaint without frustrating the customer, thereby increasing customer satisfaction and improving corporate goodwill among its clients.

Figure 3:
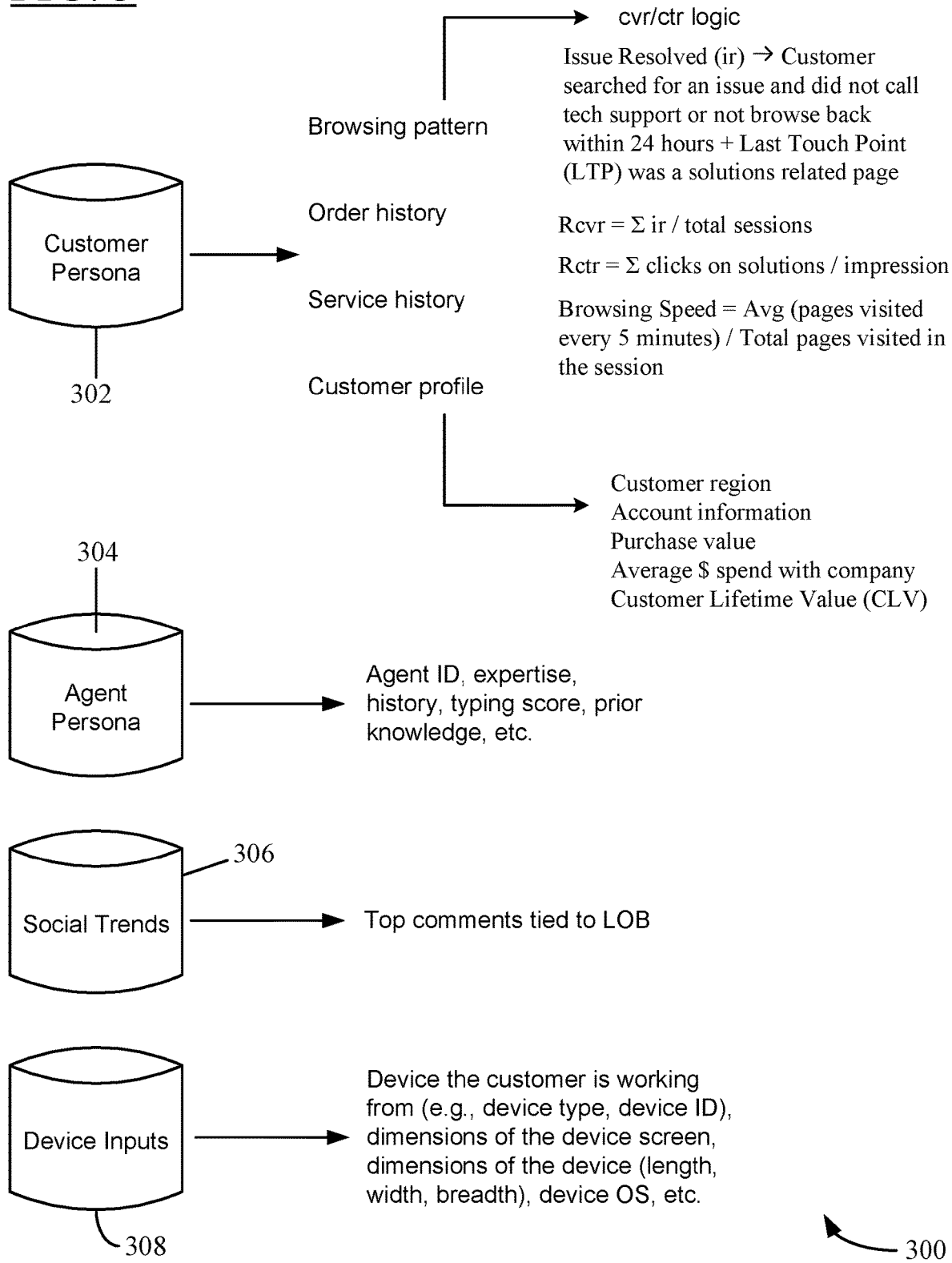
FIG. 3 is an exemplary illustration of data schema of various language-influencing factors that may be analyzed by the CCM of FIG. 1 to provide content correction as per certain embodiments of the present disclosure.

FIG. 3 is an exemplary illustration 300 of data schema of various language-influencing factors that may be analyzed by the CCM 102 of FIG. 1 to provide content correction as per certain embodiments of the present disclosure. In FIG. 3, a database 302 is shown to include information about persona of various customers, a database 304 is shown to include information about persona of various customer service agents, a database 306 is shown to include content from social media representing social trends relevant to the product support aspect being discussed here, and a database 308 is shown to contain properties of different devices used by customers in sending their textual inputs. It is understood that the above examples of various databases and their contents are non-limiting examples. In different embodiments, additional or different types of data and content may represent language-influencing factors. It is also understood that multiple databases shown in the illustration 300 are just by way of an example. In some embodiments, contents related to all language-influencing factors may be stored in a single database or in multiple databases different in number than those shown in FIG. 3. Furthermore, the database(s) may be distributed or may be part of a single computing system (such as the memory 804 in the computer system 800 in FIG. 8). In any event, architectural details of storage of the data representing language-influencing factors are not relevant to the present disclosure and, hence, are not provided herein.

In some embodiments, the contents of each database 302, 304, 306, and 308 may be based on historical data collected as part of training the ML module 102. In addition, some content may be generated in real-time when the trained version of the ML module 102 is implemented. For example, a customer's browsing pattern may be monitored by the ML module 102 at run-time and corresponding data generated for further analysis. As another example, new data obtained through search of various social media platforms may be added to the historical data about social trends in the database 306. If a customer does not have sufficient prior interaction with the corporate entity or if there is insufficient information about the customer (like customer profile or service history), the CC module 102 may attempt to collect as much information as possible at run-time by monitoring customer's interactions with the product support website/portal and add such customer-specific information to the relevant database 302 along with other already-available (historical) information about the customer.

In particular embodiments, some exemplary data associated with a customer-specific persona may include one or more of the following: (i) an online browsing pattern (discussed in more detail below) of the customer before the customer sends a textual content to the product support system, (ii) an online search history of the searches of the corporate product support database (or other related search platform) performed by the customer prior to sending the textual content for assistance, (iii) a respective timestamp value for each database search in the online search history, (iv) a customer profile (discussed below) associated with the customer, (v) a record of website pages visited by the customer prior to sending the textual content (received by the CC module 102 at block 202 in FIG. 2), (vi) an order history of one or more prior product orders placed by the customer with the corporate entity (with which the agent is associated to provide customer support), and (vii) a service history of one or more prior service orders placed by the customer with the corporate entity. As noted earlier, in different embodiments, additional or different types of data and content may comprise the customer persona-related values.

As shown in FIG. 3, in some embodiments, the customer profile may include, for example, some or all of the following: (i) information about customer's geographical region (based, for example, on the customer's address on file with the company), race, gender, ethnicity, cultural background, and education level; (ii) account information or current account status of the customer (for example, if it is an active account, a dormant account, a delinquent account, and so on); (iii) customer lifetime value (CLV) or the level of importance of the customer (reflecting, for example, if the customer is a big volume client, a smaller client, and the like); (iv) purchase value of the product at issue; and (v) past business transactions with the company reflecting the average dollars spent with the company over a pre-defined time period. In one embodiment, prior interactions with the customer (for example, transcripts of phone conversations or other audio communications with the customer, or a record of online chat with the customer) may be evaluated by the CC module 102 along with the current browsing pattern (discussed below) of the customer to figure out customer's state of mind, which also may influence a customer's choice of words in the current text message prepared by the customer.

In particular embodiments, determination of a customer's browsing pattern may include evaluation of a number of different parameters such as, for example, an "ir" (Issue Resolved) value, an Rctr (Resolution of click-through rate) value, an Rcvr (Resolution of conversion rate) value, and browsing speed. Typically, a customer may use a web browser (not shown) on the customer's information handling system to access a product support website of the company. When a need arises for the customer to look for a solution to a problem afflicting his/her information handling system, the customer may visit different web pages of the product support website to search for the articles or content related to the problem on hand. The customer may also visit other websites or general discussion portals on the Internet to read about possible solution(s). The customer's browsing history for a particular online session may indicate the total number of web pages visited by the customer during the session. In one embodiment, as indicated in FIG. 3, the browsing speed may be determined as a ratio of the average number of web pages visited by the customer during a pre-defined time period (for example, every 5 minutes) divided by the total number of web pages visited in a specific online session. The Rctr value may be determined as the total number of clicks by the customer on solutions per impression of a web page presented to the customer ($=\Sigma$ clicks on solutions/impression). The "ir" value may be counted each time a customer searches for an issue and does not call the technical support or does not browse back for technical support within 24 hours, and the last web page visited by the customer (the Last Touch Point (LTP)) was a solutions related page. The Rcvr value may be determined as a ratio of the total of all "ir" values counted (for example, before the customer sends the textual content at block 202 in FIG. 2) divided by the total number of corresponding online sessions (=Σ ir/total sessions). In certain embodiments, additional factors typically used in the analysis of website traffic and effectiveness of online advertising may be suitably modified and implemented in the context of the present disclosure to determine the browsing pattern of a customer.

In the context of the database 304, in certain embodiments, some exemplary data associated with an agent-specific persona may include one or more of the following: (i) a personal identifier (like, a company-issued Agent ID) assigned to the agent, (ii) a job profile associated with the agent, (iii) a score that reflects the subject matter expertise level of the agent in solving problems related to the company's product or related to a specific type of product, (iv) a score that reflects the typing level (which may include the typing speed) of the agent and may indicate whether the typing is clear, concise, and informative or not, (v) a score that reflects prior performance history of the agent in resolving customer problems in a satisfactory manner, and (vi) a value that identifies a level of prior communication (for example, complete, incomplete, matter pending, matter resolved to satisfaction, and the like) between the customer and the agent. As mentioned before, in different embodiments, additional or different types of data and content may comprise the agent persona-related values.

With reference to the database 306, it is observed that, in certain embodiments, top comments and discussions in various online social media tied to a company's Line of Business (LOB) and related to various products sold by the company (including, for example, product reviews, discussion about product recalls, product defects, customer support issues, solutions to similar problems recommended by other users of the social media, and so on) may be collected and stored in the database 306 as part of the social trends relevant to the customer's textual content (for example, the textual content received at block 202 in FIG. 2). As mentioned earlier, in different embodiments, additional or different types of data and content may comprise the social trends-related content in the database 306.

In the context of the database 308, some exemplary device properties associated with a customer's device and stored as "device inputs" in the database 308 may include one or more of the following: (i) the type of the device (for example, a smart phone, a tablet, a laptop computer, and the like), (ii) the brand of the device because, for example, a company may sell different products under different brand names, (iii) the device ID, serial number or other similar identifier of the device, (iv) physical dimensions (length, width, and breadth) of the device (which may be available from the corporate product database or other online source), (v) physical dimensions of the display screen of the device, and (vi) the Operating System (OS) of the device (for example, Windows™, Windows Mobile™, Android™, Apple iOS™, and so on). As noted before, in certain embodiments, additional or different types of data and content may comprise the customer device-related values.

As mentioned before, many of the values and parameters for various language-influencing factors discussed with reference to FIG. 3 may be readily available, for example, when a customer first establishes an online account with a company and creates a customer profile or fills out a specific web-based form, or when the company establishes the customer account (as, for example, at the time of a sale of a product to the customer), and the like. Furthermore, additional customer-specific information may be collected whenever the customer interacts with the company—whether through a phone call (the transcript of which may provide the needed information), online chat, or browsing of the company's website. Certain agent-specific information may be available from the corporate staff-related data storage (for example, a human resource (HR) database of the company) and additional information may be collected whenever an agent interacts with a customer (through phone or online chat). The social media may be periodically surveyed online to collect the relevant content therefrom.

FIG. 4 shows an exemplary set of data fields 400 associated with the data schema 300 illustrated in FIG. 3. The CC module 102 may operate on the data in the data fields 400. The data related to the language-influencing factors may be assigned a relevant data field as shown in the exemplary arrangement in FIG. 4 for data analytics by the CC module 102. For example, some data may be treated as conversion variables or elastic variables (eVars), whereas some other data may be treated as traffic variables (props). As is known, an eVar is a persistent or sticky variable that holds its value until the variable expires after a pre-defined time period (for example, in a week, in a month, or after a customer's visit to a webpage/website). On the other hand, a prop is a non-persistent variable that allows for the breakdown of things like page views into more meaningful information such as the name of the page, or the section name of the website. Traffic data may include the number of visits to a web page, visitors, page views, sub-sections, internal search terms, and the like. In FIG. 4, the data collectively identified by the reference numeral "402" represent the earlier-discussed data collected as part of the data schema 300 in FIG. 3. For the sake of brevity, only some of the data fields 400 in FIG. 4 are explained here briefly. The data field 404 may contain the text of the search query (here, "machine not working") received from a customer, whereas the data field 405 may contain information about the OS (here, Windows™ operating system) of the customer's device. As shown, in one embodiment, these data may be treated as eVars. The data field 406 may contain an ID number assigned to the customer as a marketing cloud visitor ID (mcvisid), whereas the data field 407 may contain an internally-assigned pageID of each web page visited by the customer. The data fields 408-410, on the other hand, are examples of data fields related to the agent persona. In the embodiment of FIG. 4, the data field 408 contains a rating of the agent's expertise (here, a score of "2"), for example, on a scale of 1 (least experienced) through 5 (most experienced) in handling customer support issues. The data field 409 may contain an average Time-to-Complete (TTC) value (here, for example, 2.34 minutes) based on a history of time taken by the agent to complete/resolve various support requests. Finally, the data field 410 may contain the agent's typing score (here, a score of "87"), which, in some embodiments, may be based on the average number of characters logged by the agent (for example, per minute) during a product support (or chat) session.

FIG. 5 is an exemplary block diagram 500 providing an overview of two different types of content correction by the CCM 102 of FIG. 1 as per certain embodiments of the present disclosure. In FIG. 5, a customer 502 is shown to be in communication with an online search platform 504 (for example, a corporate product support website) and a customer service agent 506. Such communication may or may not be going on simultaneously. For ease of discussion, the same reference numeral is used to refer to a human operator as well as a device or system being operated by the human operator. Thus, for example, the reference numeral "502" may refer to a customer or the customer's device, depending on the context of discussion. The architectural and operational details of the customer's device's 502 connection with the search platform 504 or with the agent's computer system 506 are not relevant to the present discussion and, hence, are not provided herein. As mentioned before, the CCM 102 may interface between two communicators exchanging textual content. In the context of FIG. 5, the CCM 102 is shown to connect to the customer's device 502 on one side and with the other two "communicators" (the search platform 504 and the agent's system 506) on the corporate side.

The reference numeral "508" relates to the first example of how the CCM 102 may correct the customer's 502 search query before it is sent to the search platform/search engine (or product support database) 504. On the other hand, the reference numeral "510" relates to the second example of how the CCM 102 may correct the customer's chat message and agent's corresponding chat response as per teachings of the present disclosure. Referring now to the first example 508, it is observed that the customer 502 sends the search term/query "machine not working" (identified by reference numeral "512") to the search platform 504 to search for articles, discussions, or other content from which the customer 502 may obtain a solution to his/her problem. The search term/query 512 may be initially received by a computing system (such as the computer system 800 in FIG. 8) running the CCM 102. As discussed in more detail later with reference to FIG. 6, the CCM 102 may parse the received query 512 and apply relevant language-influencing factors (discussed before with reference to FIGS. 3-4) to generate a modified search query to be sent to the online search engine 504 instead of the original query 512. In the context of the first example 508, some exemplary values of various language-influencing factors are shown in FIG. 5 and collectively identified using the reference numeral "514." The modified search query generated by the CCM 102 and sent to the online search engine 504 is identified using the reference numeral "515." It is seen that in the modified query 515 the CCM 102 has corrected the general term "machine" in the original query 512 to now clearly identify the type (laptop) and brand (XYZ) of the "machine". If the CCM 102 were a simple translator or spell-checker, it would not have corrected the term "machine." However, as mentioned before, the CCM 102 is an intelligent analytical tool that goes beyond rudimentary translation or spell-checking. When this more specific and clear search term 515 is sent to the search engine 504, the chance of the user 502 receiving more relevant and meaningful search results increases significantly. As discussed later with reference to FIG. 7, in some embodiments, the texts of the search results from the search platform 504 may be similarly modified by the CCM 102 to personalize it based on the user's persona and the device on which the user is receiving the search results.

Referring now to the second example 510, if the customer 502 decides to initiate a chat with a customer service agent (such as the agent 506), the customer 502 may send a chat message 517. As shown in FIG. 5, the initial chat message 517 includes a non-technical, colloquial term "Gooye" that users typically use in speech (for example, when speaking over a microphone to input text) or in social media discussions to refer to a web browser or Graphical User Interface (GUI). As before, this initial chat message 517 may be initially received by the CCM 102, which may parse it and apply relevant language-influencing factors (discussed before with reference to FIGS. 3-4) to generate a modified chat message to be sent to the agent 506 instead of the original message 517. In the context of the second example 510, some exemplary values of various language-influencing factors are shown in FIG. 5 and collectively identified using the reference numeral "518." The modified chat message generated by the CCM 102 and sent to the customer support agent 506 is identified using the reference numeral "519." It is seen that in the modified chat message 519, the CCM 102 has corrected the non-technical term "Gooye" in the original message 517 and replaced it with the correct technical term "GUI" to provide more accurate information to the agent 506 so that the agent 506 can meaningfully troubleshoot customer's problem. Furthermore, it is seen from the input values 518 that the CCM 102 has identified that the customer's device is a mobile device (such as a smart phone) of ABC brand. This contextual content also may be provided by the CCM 102 to the agent 506 to assist him/her in crafting proper response to the user 502. As a result, in the embodiment of FIG. 5, the agent 506 may provide a response 520 informing the customer 502 of agent's knowledge of the customer's device (here, a mobile device) and requesting the customer to run an agent-recommended test on a non-mobile device (such as a laptop or desktop PC). The customer 502 may perceive the response 520 as an intelligent and meaningful approach towards solving his/her problem, thereby increasing the customer's faith and trust in the company's product support efforts. As discussed later with reference to FIG. 7, in some embodiments, certain textual content in the agent's response may be similarly modified by the CCM 102 to personalize it based on the user's persona and the device on which the user is receiving the chat communication from the agent 506.

Although not shown in FIG. 5, below are three other examples where intelligent correction/modification of textual content by the CCM 102 may greatly facilitate problem-solving. For example, if a customer (such as the customer 502) complains that "the killer in my system has stopped working," a spell-checker application would not find any error in that sentence and a literal translation would produce an absurd result. However, in the context of a technical product support, the CCM 102 may analyze relevant information (such as, for example, social media discussion, customer device properties and other related product information) to intelligently identify the brand of customer's product (for example, ABC system) and conclude that the context of this sentence relates to a problem with a Killer modem in the product supplied by Killer Networking (www.killernetworking.com). The CCM 102 may then modify the original query/chat message to now state that "the Killer modem in my ABC system has stopped working." Such intelligent correction greatly enables the problem solver (for example, a support website or a service agent) to perform a more meaningful search for a solution. As another example, in a computer system of XYZ brand, the processor may be supplied by Intel® corporation, whereas the Solid State Drive (SSD) may be either an Intel® brand SSD or a Samsung® brand SSD. Therefore, if a customer merely states that "the Intel part keeps freezing randomly," the CCM 102 may analyze relevant language-influencing factors to establish the proper context for the customer's text (such as, for example, which product the customer is talking about, what is the product configuration of that product, and what parts are supplied by Intel® in that product) and conclude that the customer is likely complaining about the Intel processor in his/her system. The CCM 102 may then modify the customer's initial text to now read: "The Intel processor in XYZ system keeps freezing randomly." This clarity would enable a support agent to look for the right solution(s) to the problem or ask more relevant questions to the customer to find a proper solution. As a final example, if a customer sends a query that "my latitude is running slow," the CCM 102 would use the context to recognize that the term "latitude" is not a geographical term, but a technical term referring to a Latitude™ brand laptop computer by Dell® Corporation. As can be seen from these additional examples, the intelligent conversion of textual content by the CCM 102 clearly enhances customer support. It is understood that the CCM 102 may perform similar textual corrections to the texts received from the agent 506 or in a knowledge base (KB) article supplied by the search platform 504.

FIG. 6 is an exemplary illustration 600 of how the contents of a textual search query 602 may be corrected by the CCM 102 of FIG. 1 as per particular embodiments of the present disclosure. Although the search query 602 in FIG. 6 is the same as the search term 512 in FIG. 5, each of them is identified using a different reference numeral for ease of discussion. Initially, in certain embodiments, the CCM 102 may parse the original query 602 using Named Entity Recognition (NER) and Natural Language Processing (NLP) techniques to extract information for classification of the query. For example, as shown in FIG. 6, the parsing of the query 602 may identify a product (here, through the presence of the term "machine" in the query 602), a stop word (here, the term "not"), and an issue (here, the term "working" may indicate issue with the operation of the identified product).

As noted before, the CCM 102 may be preferably continually trained using historical and current data to perform query parsing and text analysis as per teachings of the present disclosure. In one embodiment, the training process may be dynamically performed in the background every time the content of any of the databases 302, 304, 306, and 308 in FIG. 3 is updated with new data as new product orders are placed, new service issues are resolved, new social media discussion becomes available, new customers are added to the corporate client list, and so on. The training of the CC module 102, in turn, may be similarly updated to provide a robustly-trained CC module 102. In other embodiments, additional or different information also may be stored as part of the databases 302, 304, 306, and 308. In different embodiments, different ML techniques/models may be used as classifiers to parse and classify each sample text. Some exemplary ML classifiers include a neural-network based Support Vector Machine (SVM) classifier (linear), a Random Forest classifier, a Logistic Regression model, and a Multinomial Naive Bayes model. These classifiers may use deep learning based NLP techniques along with Sentiment Analysis models to classify the received text for auto-correction. Sentiment Analysis models may use data mining processes, text analysis, and other language-processing techniques to identify, extract, and capture data for analysis to discern subjective opinion of a document or collection of documents like blog posts, news articles, social media feeds, and so on. An ML classifier may filter out or remove irrelevant terms in a parsed query and keep only relevant terms for further processing and correction (if needed).

Referring again to FIG. 6, the ML model/classifier in the CC module 102 may perform text classification based, for example, on the customer persona 604 (similar to the customer persona 302), social medial inputs 605 (similar to the social trends 306), and (customer) device inputs 606 (like the device inputs 308). The data associated with reference numerals 604-606 may be retrieved from the respective database 302, 306, and 308 in FIG. 3 or collected at run-time. In one embodiment, a rule engine of the ML model may identify the product name if the asset tag (here, the "asset" being the product for which support is requested) is entered by the client in the original query 602, otherwise the rule engine may generate the product name based on the customer persona 604 (for example, browsing patterns, customer profile, and the like) and using collaborative filtering. Thus, as shown in FIG. 6, the product-related term "machine" in the parsed query is identified as an "XYZ laptop" based on an analysis of the customer persona 604. This replacement term (here, an "XYZ laptop" or "XYZ system") may be used in place of the original term "machine" to search for social media content related to problems or bugs in XYZ systems and corresponding solutions (if any), as noted at the reference numeral "605."Consequently, the CC module 102, through its rule engine, may auto-correct various abbreviations and other less-than-clear terms in the original query 602 based on the relevant content of customer persona 604 as well as additional information from social media inputs 605 and customer's device-specific inputs 606, as shown in FIG. 6. As a result, the CC module 102 may generate a corrected query 608 that reads "XYZ laptop is not working." As discussed earlier, this corrected query 608 may be sent to the relevant recipient (for example, the agent 506 or the search engine 504 in FIG. 5) instead of the original query 602 for a more meaningful search for a solution to the customer's problem. As mentioned earlier and also discussed below with reference to FIG. 7, any response from the agent 506 or a knowledge base (KB) article retrieved by the search engine 504 may be appropriately modified based on the customer persona 604 and user device inputs 606 to personalize them for the user/customer (for example, the customer 502 in FIG. 5).

Figure 7:
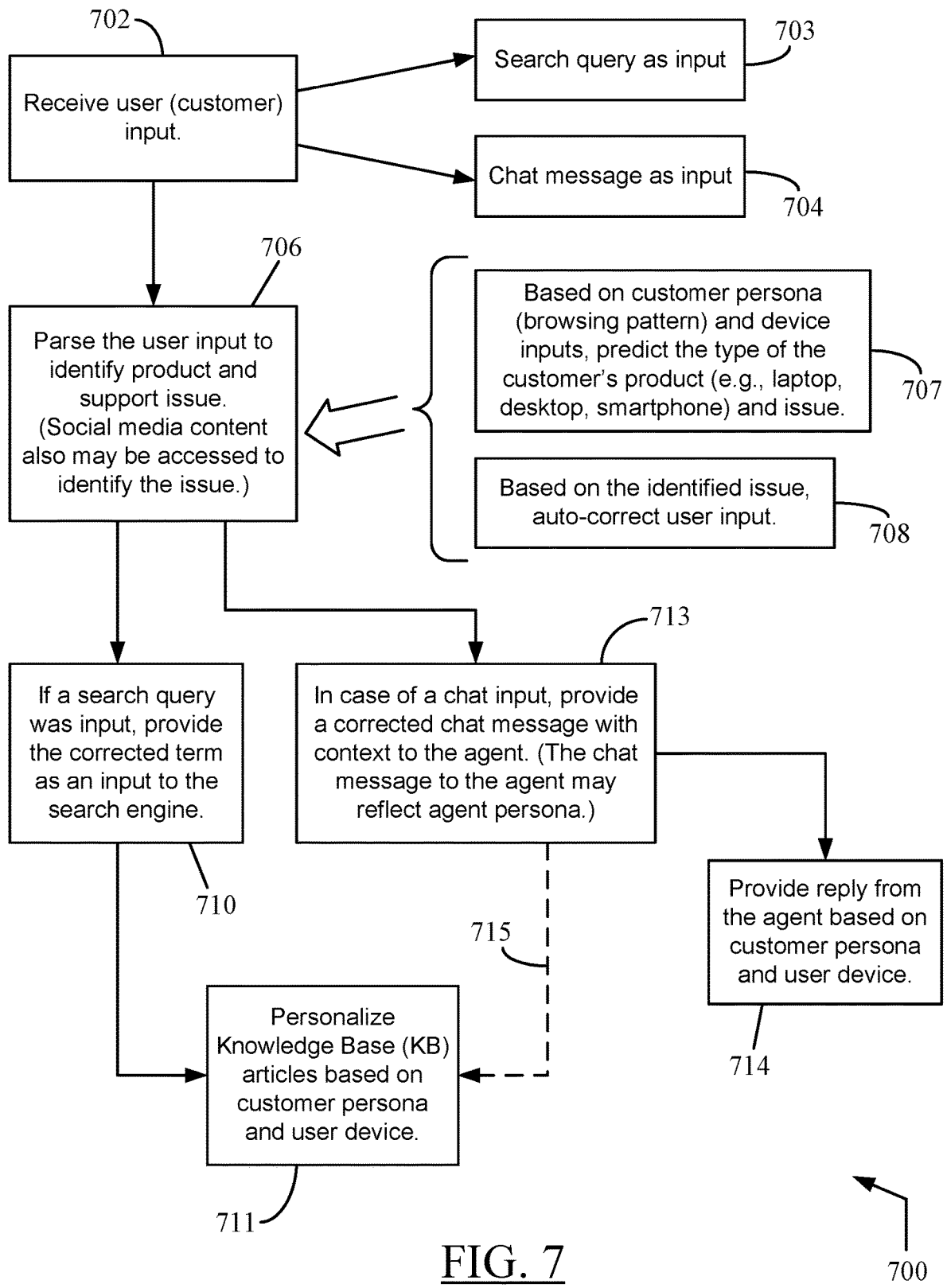
FIG. 7 shows an exemplary flowchart of the operational details of the CCM of FIG. 1 in a product support environment as per particular embodiments of the present disclosure.

FIG. 7 shows an exemplary flowchart 700 of the operational details of the CCM 102 of FIG. 1 in a product support environment as per particular embodiments of the present disclosure. As in case of FIG. 2, various tasks shown in FIG. 7 may be performed by a computing system (such as the system 800 in FIG. 8) as per particular embodiments of the present disclosure. More generally, the computing system performing the tasks shown in FIG. 7 may include in hardware and/or software the functionality of the CC module 102. In one embodiment, the program code for the CC module 102 (and other relevant program code such as the program code for an operating system managing the execution of the module 102) may be executed by a processor (such as the processor 802 in FIG. 8) in the computing system, and, upon execution of the program code, the computing system may be operative to perform the tasks illustrated in FIG. 7.

Initially, at block 702, the CCM 102 (more specifically, the computing system executing the CCM 102) may receive a textual input from a user/customer (such as the customer 502 in FIG. 5). As shown in FIG. 7, the user input may be a search query (block 704) to be processed by an online search engine (such as the platform 504 in FIG. 5) or a chat message (block 704) to be sent to a product support agent (such as the agent 506 in FIG. 5). An exemplary user input is shown at reference numeral "602" in FIG. 6. As noted at block 706, the CCM 102 may parse the user input to identify the product for which support is being requested and the support issue (such as, for example, the product not working properly or a component of product requiring replacement, and so on). In particular embodiments, the CCM 102 may analyze customer persona (including the customer's browsing pattern) and device inputs (related to the customer's device) to predict the type of the customer's product (such as, for example, a laptop or desktop PC, a smart phone, and the like) and the service issue (block 707). For example, if the user's device is a smart phone and the user is sending the service request or related content via text messages, it is understandable that the user may use shorter terms or more acronyms in his/her communication because of textual/content restrictions posed by the user's device and transmission mechanism (such as, for example, cell phone Short Message Service (SMS) texts). As another example, if the user's communication is via e-mails over the Internet, that mode of communication can also pose its own restrictions on transmission of textual content. The CCM 102 may consider these device-related aspects along with customer persona to properly modify the received text. In certain embodiments, the CCM 102 also may analyze relevant social media content to identify the support issue on hand, as indicated at block 706. Based on the identified issue, the CCM 102 may auto-correct the original user input (received at block 702) to more clearly reflect the user's product and support issue, as noted at block 708. The tasks mentioned at blocks 706-708 are illustrated in FIG. 6 with reference to an exemplary query 602. As discussed with reference to FIG. 6, the parsing of the query 602 in view of the customer persona, device inputs, and social media trends may generate the corrected query 608 clearly identifying the product (here, an XYZ laptop) and support issue (here, the operation/working of the product).

As noted at block 710, if the CCM 102 received the user input (at block 702) as a search query, the CCM 102 may provide the corrected term (generated at block 708) as an input to the search engine instead of the original term received at block 702. Furthermore, in certain embodiments, the CCM 102 may personalize any KB articles received in the response from the search engine based on the customer persona and customer's device (block 711). For example, if the CCM 102 intelligently detects (for example, from the user's browsing pattern, prior search attempts, or earlier textual communication) that the user is a non-technical person or someone who is not technically savvy, the text in a KB article may be suitably modified to be easily readable by the recipient (here, the customer). As another example, if the user's device is a smart phone and the user is communicating via SMS messages, the content of the KB article may be suitably compressed, shortened, or modified so that it can be made easily readable to the user on his/her device screen under the given communication mode (such as, for example, SMS messages or e-mails). Thus, based on customer persona and customer device properties, the CCM 102 may intelligently modify relevant text as to how the customer (here, the recipient) would like it to be presented to him/her.

Referring now to block 713, if the CCM 102 received the user input (at block 702) as a chat message to be sent to an agent, the CCM 102 may provide a corrected chat message (as discussed before with reference to the second example 510 in FIG. 5) with relevant context to the agent instead of the original message received at block 702. As also noted at block 713, in some embodiments, the corrected chat message to be sent to the agent may reflect agent persona (such as the agent persona obtained from the database 304 in FIG. 3) as well (in addition to other language-influencing factors at blocks 706 and 707). For example, if the agent is an experienced agent with prior knowledge of the customer's problem, then the original chat message (at block 702) may be modified with agent-specific technical content and prior context to present it to the agent in a highly meaningful manner to expedite the resolution of the customer's problem. As another example, if the agent utilizes certain words/terms more frequently in his/her communication, the corrected chat message may be modified, if possible, to insert such words in it to personalize the message for the agent. As in case of the personalization of a KB article at block 711, a chat reply from the agent may be similarly personalized for the customer based on the customer persona and customer's device, as noted at block 714.

It is noted here that the arrow 715 is shown dotted in FIG. 7 to indicate the optional nature of the task at block 711 for the agent. In other words, in certain embodiments, in addition to, as part of, or in place of the chat reply at block 714, the agent may optionally choose to send a link to one or more KB articles related to the possible solution to the customer's problem or the entire text (or a selected portion) of a relevant KB article to the customer. In particular embodiments, the KB article(s) may be retrieved from a search of articles in a corporate product support database (such as the search platform 504 in FIG. 5). As before, the text of a KB article—whether downloaded via the agent-sent link or sent as part of the agent's chat response—may be personalized for the customer as noted at block 711.

As mentioned before, the CCM 102 may perform all text conversions in real-time. For example, a live chat between the customer and the agent may be automatically converted in real-time without noticeable interference or interruption in the flow of the communication. As another example, in some embodiments, if an audio recording of a user's telephone call with a customer service agent is made (for example, for user security and quality assurance purpose), one version of the transcript of that call may be saved in its original, non-technical form (assuming that the customer is a non-technical person). However, the CCM 102 may operate on a copy of that transcript and generate a second, technical version of the transcript in which non-technical terms may be modified or adjusted for the intended reader (for example, a customer service agent) based on a number of language-influencing factors (such as customer persona, social trends, and so on, as discussed before). As another example, if the user requests a copy of the original transcript, the CCM 102 may again generate a modified version of the original transcript in which technical inputs by the agent may be suitably adjusted/modified for the recipient's persona and device (here, the customer persona and customer device). Furthermore, if the user is communicating, for example, via e-mails over the Internet or through cell phone based SMS messages, then the text in the converted transcript to be sent to the user may be compressed to facilitate transmission over a communication channel having textual/content restriction (here, Internet e-mails or SMS messages).

It is observed here that although the discussion herein is provided primarily with reference to a customer being the initial communicator of textual content, the teachings of the present disclosure equally apply to a situation in which an agent or some other person is an initial communicator. Furthermore, as discussed before, the content modification discussed herein may apply to textual content generated by or received from a non-human communicator as well (such as, for example, a KB article received from the search platform 504 in FIG. 5). More generally, the CC module 102 as per the teachings of the present disclosure may apply communicator-specific language-influencing factors (such as, for example, communicator persona, social trends, communicator device properties, and the like) to modify/correct the communicator's textual content to generate recipient-specific modified text (or make the communicator's text presentable in a recipient-specific format for easy comprehension by the recipient). In particular embodiments, the CCM 102 also may consider recipient-specific language-influencing factors while modifying the communicator's text to generate the recipient-specific modified text.

Figure 8:
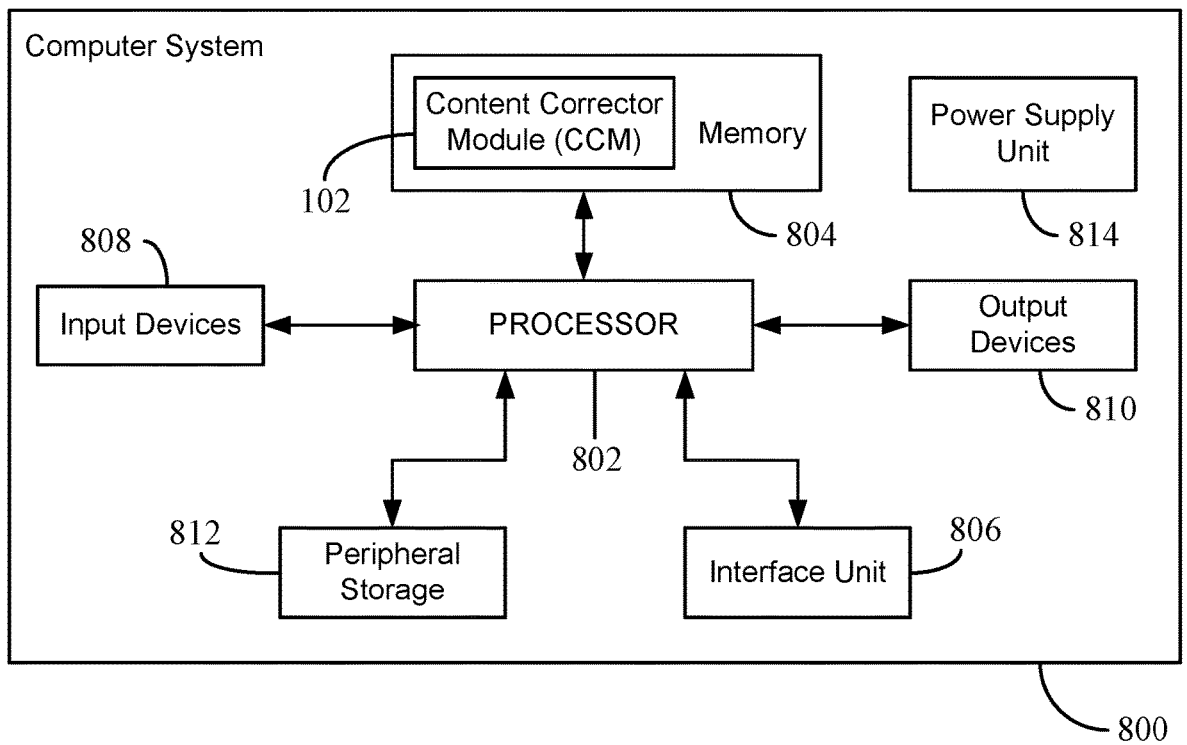
FIG. 8 illustrates an example configuration of a computer system that can be used to implement the content correction methodology described herein.

FIG. 8 illustrates an example configuration of a computer system 800 that can be used to implement the content correction methodology described herein. In particular embodiments, the CC module 102 of FIG. 1 may be used to implement the content correction methodology as per teachings of the present disclosure. The computer system (or computing device) 800 may be suitably configured to implement the functionality of the CC module 102. The computer system 800 may include one or more processors 802, a memory unit 804, an interface unit 806 providing communication interfaces, one or more input devices 808, one or more output devices 810, and a peripheral storage unit 812, connected to the processor 802 as shown and configured to communicate with each other, such as via one or more system buses (not shown) or other suitable connection. In some embodiments, the computer system 800 may be an information-handling system mentioned before.

In one embodiment, the input devices 808 may enable an operator (not shown) of the system 800 to provide inputs to the processor 802 and the CC module 102, for example, to configure the system 800, train the CC module 102, and/or to provide other processing as per teachings of the present disclosure. The input devices 808 may include, for example, a touchpad, a camera, a computer keyboard, a touch-screen, a joystick, a physical or virtual "clickable button," a computer mouse/pointing device, and the like. A display screen is an example of the output device 810. Other examples of an output device include a graphics/display device, a computer screen or monitor, an alarm system, or any other type of data output device. In some embodiments, the input device(s) 808 and the output device(s) 810 may be coupled to the processor 802 via an I/O or peripheral interface(s). In some embodiments, the computer system 800 may include more than one instance of the devices shown. In various embodiments, all of the components shown in FIG. 8 may be housed within a single housing. In other embodiments, the computer system 800 may not include all of the components shown in FIG. 8. Furthermore, the computing device 800 may be configured as a standalone system, as a server system, as a client system, or in any other suitable form factor. In some embodiments, the computer system 800 may be operated by an agent (such as the agent 506 in FIG. 5).

The processor 802 is a hardware device that may include a single processing unit or a number of processing units, all of which may include single or multiple computing units or multiple cores. When the computing device 800 is a multi-processor system, there may be more than one instance of the processor 802 or there may be multiple processors coupled to the processor 802 via their respective interfaces (not shown). The processor 802 may include an integrated Graphics Processing Unit (GPU) or the GPU may be a separate processor device in the system 800. The processor 802 may be implemented as one or more microprocessors, microcomputers, microcontrollers, Digital Signal Processors (DSPs), Central Processing Units (CPUs), Graphics Processing Units (GPUs), state machines, logic circuitries, and/or any devices that manipulate signals based on operational instructions. Among other capabilities, the processor 802 may be configured to fetch and execute computer-readable instructions stored in the memory 804, the peripheral storage 812, or other computer-readable media. In some embodiments, the processor 802 may be a System on Chip (SoC).

The memory 804 and the peripheral storage unit 812 are examples of non-transitory computer media (e.g., memory storage devices) for storing instructions that can be executed by the processor 802 to perform the various functions described herein. For example, the memory unit 804 may include both volatile memory and non-volatile memory (e.g., RAM, ROM, or the like) devices. Further, in particular embodiments, the peripheral storage unit 812 may include one or more mass storage devices such as, for example, hard disk drives, solid-state drives, removable media, including external and removable drives, memory cards, flash memory, floppy disks, optical disks (e.g., CD, DVD), a storage array, a network attached storage, a storage area network, or the like. Both memory 804 and mass storage devices constituting the peripheral storage 812 may be collectively referred to as memory or computer storage media herein, and may be a media capable of storing computer-readable, processor-executable program instructions as computer program code that can be executed by the processor 802 as a particular machine configured for carrying out the operations and functions described in the implementations herein.

The computing device 800 may also include one or more communication interfaces as part of its interface unit 806 for exchanging data via a network. The communication interfaces can facilitate communications within a wide variety of networks and protocol types, including wired networks (e.g., Ethernet, Digital Subscriber Loop (DSL), Data Over Cable Service Interface Specification (DOCSIS), Fiber Optics network, Universal Serial Bus (USB), etc.) and wireless networks (e.g., Wireless Local Area Network (WLAN), Global System for Mobile Communications (GSM), Code Division Multiple Access (CDMA), Institute of Electrical and Electronics Engineers (IEEE) standard 802.11, Bluetooth®, Wireless USB, cellular, satellite, etc.), the Internet, and the like. Communication interfaces in the interface unit 806 can also provide communication with external storage (not shown), such as in a storage array, network attached storage, storage area network, one or more databases (such as the databases 302, 304, 306, and 308 shown in FIG. 3 when implemented as an external storage), or the like. In particular embodiments, the interface unit 806 may provide a communication interface to the systems associated with the customer 502, the agent 506, and the search platform 504 in FIG. 5 to enable reception and modification of textual content generated by the respective communicator and transmission of the modified content to the relevant recipient as per teachings of the present disclosure.

The computer storage media, such as the memory 804 and the mass storage devices in the peripheral storage 812, may be used to store software and data. For example, the computer storage media may be used to store the operating system (OS) for the computing device 800, various device drivers for the device 800, various inputs provided by a communicator (such as the client 502 or the agent 506) during the implementation and operation of the CC module 102, search results received from the search platform 504, or any other type of content. In some embodiments, one or more of the databases 302, 304, 306, and 308 in FIG. 3 may be a part of the peripheral storage 812. In other embodiments, one or more of the databases 302, 304, 306, and 308 in FIG. 3 may be included as part of the system memory 804. The computer storage media also may store software applications such as a word processing application, a spreadsheet application, a web browser, the CC module 102, and the like. The program code for the software applications and the OS may be executed by the processor 802.

In one embodiment, a non-transitory, computer-readable data storage medium, such as, for example, the system memory 804 or the peripheral data storage unit 812 may store program code or software for the CC module 102 as per particular embodiments of the present disclosure. In the embodiment of FIG. 8, the system memory 804 is shown to include such program code. In the embodiment of FIG. 8, the CC module 102 may operate in conjunction with the host OS (not shown) of the computing device 800 and a web browser (not shown). The processor 802 may be configured to execute the program code for the CC module 102, whereby the computer system 800 may be operative to perform various tasks associated with the CC module 102 as per the teachings of the present disclosure. In one embodiment, such tasks may include, for example, the process steps illustrated in FIGS. 2 and 7 as well as other tasks discussed with reference to FIGS. 1 and 3-6 such as, for example, training of the CC module 102, reception of textual inputs from a communicator (such as a client or an agent), reception of search results from an online search platform, determination of relevant language-influencing factors, evaluation and analysis of received textual content against the language-influencing factors and necessary modification of the textual content, and so on. The program code or software for the CC module 102 may be proprietary software or open source software which, upon execution by the processor 802, may enable the computer system 800 to perform operations related to content correction as per teachings of the present disclosure.

In particular embodiments, the computing device 800 may include an on-board power supply unit 814 to provide electrical power to various system components illustrated in FIG. 7. The power supply unit 814 may receive batteries or may be connectable to an AC electrical power outlet. In one embodiment, the power supply unit 814 may convert solar energy or other renewable energy into electrical power.

The example systems and devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability, and, hence, are considered machine-implemented. Generally, any of the functions described with reference to the figures can be implemented using software, hardware (e.g., fixed logic circuitry) or a combination of these implementations. The terms "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions), such as the program code for the RNS module 102, that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations or embodiments, as described and as illustrated in the drawings. However, this disclosure is not limited to the implementations described and illustrated herein, but can extend to other implementations, as would be known or as would become known to those skilled in the art. Reference in the specification to "one embodiment," "particular embodiments," "this implementation," "some embodiments", or other terms of similar import, means that a particular feature, structure, or characteristic described is included in at least one implementation or embodiment, and the appearances of these phrases in various places in the specification are not necessarily all referring to the same implementation/embodiment.

Although the present disclosure has been described in connection with several embodiments, the disclosure is not intended to be limited to the specific forms set forth herein. On the contrary, it is intended to cover such alternatives, modifications, and equivalents as can be reasonably included within the scope of the disclosure as defined by the appended claims.

What is claimed is:

1. A method comprising:
   receiving, by a computing system, a first textual content sent by a first communicator for delivery to a second communicator;
   determining, by the computing system using a machine learning (ML) module, a set of language-influencing factors affecting the first textual content sent by the first communicator, wherein the set of language-influencing factors comprises:
      a first persona that reflects first communicator-specific individual characteristics shaping the first textual content generated by the first communicator,
      an information available in social media related to the first textual content, and
      a set of device properties specific to a device being used by the first communicator for sending the first textual content;
   modifying, by the computing system using the ML module, the first textual content based on the set of language-influencing factors to generate a modified first textual content; and
   sending, by the computing system, the modified first textual content to the second communicator instead of the first textual content.

2. The method of claim 1, wherein modifying the first textual content comprises:
   determining, by the computing system using the ML module, a second persona that reflects second communicator-specific individual characteristics shaping communication preferences of the second communicator; and
   modifying, by the computing system using the ML module, the first textual content based on the set of language-influencing factors as well as the second persona to generate the modified first textual content.

3. The method of claim 2, wherein the second persona comprises at least one of the following:
   a personal identifier assigned to the second communicator;
   a job profile associated with the second communicator;
   a first score reflecting a subject matter expertise level of the second communicator;
   a second score reflecting a typing level of the second communicator;
   a third score reflecting prior performance history of the second communicator; and
   a value identifying a level of prior communication between the first communicator and the second communicator.

4. The method of claim 1, further comprising:
analyzing, by the computing system using the ML module, the set of language-influencing factors to determine a context of discussion relevant to the first textual content;
wherein sending the modified first textual content comprises:
sending, by the computing system, the modified first textual content along with the context of discussion to the second communicator.

5. The method of claim 1, further comprising:
receiving, by the computing system, a second textual content sent by the second communicator for delivery to the first communicator;
modifying, by the computing system using the ML module, the second textual content based on the first persona and the set of device properties to generate a modified second textual content; and
sending, by the computing system, the modified second textual content to the first communicator instead of the second textual content.

6. The method of claim 5, wherein one of the following applies:
the first textual content is an online search query and the second textual content is a search result generated in response to processing of the modified first textual content; and
the first textual content is an online chat message and the second textual content is an online chat response to the modified first textual content.

7. The method of claim 1, wherein the first communicator is one of the following:
a human user requesting user-specific information from a corporate entity; and
a human operator associated with the corporate entity to provide customer support.

8. The method of claim 1, wherein the second communicator is one of the following:
a human user requesting user-specific information from a corporate entity;
a human operator associated with the corporate entity to provide customer support; and
an online search facility deployed by the corporate entity to provide customer support.

9. The method of claim 1, wherein the information available in social media comprises comments and discussion in social media tied to a line of business of a corporate entity related to the first textual content.

10. The method of claim 1, wherein the first persona comprises at least one of the following:
an online browsing pattern of the first communicator prior to sending the first textual content;
an online search history of database searches performed by the first communicator prior to sending the first textual content;
a respective timestamp value for each database search in the online search history;
a customer profile associated with the first communicator;
a record of website pages visited by the first communicator prior to sending the first textual content;
a first history of one or more prior product orders placed by the first communicator with a corporate entity with which the second communicator is associated to provide customer support; and
a second history of one or more prior service orders placed by the first communicator with the corporate entity with which the second communicator is associated to provide customer support.

11. The method of claim 1, wherein the set of device properties comprises at least one of the following:
a type of the device;
a brand of the device;
a device ID of the device;
physical dimensions of the device;
physical dimensions of a display screen of the device; and
an operating system of the device.

12. The method of claim 1, further comprising:
analyzing, by the computing system using the ML module, the first textual content in view of the set of language-influencing factors to automatically identify a product support issue for which the first communicator is seeking resolution; and
providing, by the computing system using the ML module, details of the product support issue along with the modified first textual content to the second communicator.

13. A computing system comprising:
a memory storing program instructions; and
a processing unit coupled to the memory and operable to execute the program instructions, which, when executed by the processing unit, cause the computing system to:
receive a first textual content sent by a first communicator for delivery to a second communicator;
determine, using a machine learning (ML) module, a set of language-influencing factors affecting the first textual content sent by the first communicator, wherein the set of language-influencing factors comprises:
a first persona that reflects first communicator-specific individual characteristics shaping the first textual content generated by the first communicator,
an information available in social media related to the first textual content, and
a set of device properties specific to a device being used by the first communicator for sending the first textual content;
modify, using the ML module, the first textual content based on the set of language-influencing factors to generate a modified first textual content; and
send the modified first textual content to the second communicator instead of the first textual content.

14. The computing system of claim 13, wherein the program instructions, upon execution by the processing unit, cause the computing system to further perform the following to generate the modified first textual content:
determine, using the ML module, a second persona that reflects second communicator-specific individual characteristics shaping communication preferences of the second communicator; and
modify, using the ML module, the first textual content based on the set of language-influencing factors as well as the second persona to generate the modified first textual content; and
wherein the program instructions, upon execution by the processing unit, cause the computing system to:
receive a second textual content sent by the second communicator for delivery to the first communicator;

modify, using the ML module, the second textual content based on the first persona and the set of device properties to generate a modified second textual content; and send the modified second textual content to the first communicator instead of the second textual content.

15. The computing system of claim 14, wherein one of the following applies:

the first textual content is an online search query and the second textual content is a search result generated in response to processing of the modified first textual content; and the first textual content is an online chat message and the second textual content is an online chat response to the modified first textual content.

16. The computing system of claim 13, wherein the first persona comprises at least one of the following:

an online browsing pattern of the first communicator prior to sending the first textual content;

an online search history of database searches performed by the first communicator prior to sending the first textual content;

a respective timestamp value for each database search in the online search history;

a customer profile associated with the first communicator;

a record of website pages visited by the first communicator prior to sending the first textual content;

a first history of one or more prior product orders placed by the first communicator with a corporate entity with which the second communicator is associated to provide customer support; and a second history of one or more prior service orders placed by the first communicator with the corporate entity with which the second communicator is associated to provide customer support; and wherein the set of device properties comprises at least one of:

a type of the device;
a brand of the device;
a device ID of the device;
physical dimensions of the device;
physical dimensions of a display screen of the device; and
an operating system of the device.

17. A computer program product comprising a non-transitory computer-usable medium having computer-readable program code embodied therein, the computer-readable program code adapted to be executed by a computing system to implement a method comprising:

receiving a first textual content sent by a first communicator for delivery to a second communicator;

determining, using a machine learning (ML) module, a set of language-influencing factors affecting the first textual content sent by the first communicator, wherein the set of language-influencing factors comprises:

a first persona that reflects first communicator-specific individual characteristics shaping the first textual content generated by the first communicator, an information available in social media related to the first textual content, and a set of device properties specific to a device being used by the first communicator for sending the first textual content;

modifying, using the ML module, the first textual content based on the set of language-influencing factors to generate a modified first textual content; and sending the modified first textual content to the second communicator instead of the first textual content.

18. The computer program product of claim 17, wherein modifying the first textual content comprises:

determining, using the ML module, a second persona that reflects second communicator-specific individual characteristics shaping communication preferences of the second communicator; and modifying, using the ML module, the first textual content based on the set of language-influencing factors as well as the second persona to generate the modified first textual content; and wherein the method further comprises:

receiving a second textual content sent by the second communicator for delivery to the first communicator;

modifying, using the ML module, the second textual content based on the first persona and the set of device properties to generate a modified second textual content; and sending the modified second textual content to the first communicator instead of the second textual content.

19. The computer program product of claim 18, wherein one of the following applies:

the first textual content is an online search query and the second textual content is a search result generated in response to processing of the modified first textual content; and the first textual content is an online chat message and the second textual content is an online chat response to the modified first textual content.

20. The computer program product of claim 17, wherein the first persona comprises at least one of the following:

an online browsing pattern of the first communicator prior to sending the first textual content;

an online search history of database searches performed by the first communicator prior to sending the first textual content;

a respective timestamp value for each database search in the online search history;

a customer profile associated with the first communicator;

a record of website pages visited by the first communicator prior to sending the first textual content;

a first history of one or more prior product orders placed by the first communicator with a corporate entity with which the second communicator is associated to provide customer support; and a second history of one or more prior service orders placed by the first communicator with the corporate entity with which the second communicator is associated to provide customer support; and wherein the set of device properties comprises at least one of the following:

a type of the device;
a brand of the device;
a device ID of the device;
physical dimensions of the device;
physical dimensions of a display screen of the device; and
an operating system of the device.

* * * * *